May 14, 1957  R. C. ALLEN  2,792,209
MEANS TO DETERMINE THE WEIGHT LOAD OF A MOTOR VEHICLE
Filed April 3, 1952

INVENTOR
ROBERT C. ALLEN

__United States Patent Office__

2,792,209
Patented May 14, 1957

2,792,209

MEANS TO DETERMINE THE WEIGHT LOAD OF A MOTOR VEHICLE

Robert C. Allen, Comanche, Tex.

Application April 3, 1952, Serial No. 280,412

2 Claims. (Cl. 265—40)

The present invention relates to determining the weight load of a body, and more particularly has reference to means for indicating the weight load of mobile vehicles such as trucks, trailers and the like, primarily for the purpose of indicating whether the vehicle is overloaded.

Needless to say, due to traffic regulations of municipalities and States, it is necessary that vehicles moving along the highways should not be overloaded. While, of course, various types of devices have heretofore been provided for ascertaining the weight load of such vehicles, they are not entirely satisfactory.

In most vehicles, the truck bed is carried by spring assemblies which are bolted or otherwise attached to the wheel axle and such springs are the only suspension for the bed of the truck, even though the truck is of the type having multi-wheels. The weight, of course, is based on the axle load and a weight load which may be improperly distributed on the floor of the truck bed will, of course, have relationship with respect to the nearest axle support.

In the present invention, the control means for actuating the signalling system is carried by the vehicle body at such a location or locations that any upward or downward movement of the vehicle body will be detected within very fine limits.

More specifically, the present concept is based on the movement of a metal object or "slug" within a coil which is in a resonant circuit which is link coupled to an oscillator circuit controlling an amplifier circuit which actuates a relay controlling the circuit to a signal lamp or lamps.

The oscillator circuit includes a vacuum tube to generate radio frequency energy, which energy is link coupled to the slug tuned resonant circuit and the energy may be amplified by a vacuum tube in whose plate circuit which includes an inductance is a plate circuit relay. As the slug within the tuned circuit is caused to move within the field, there will be a corresponding effect upon the resonance condition of the plate circuit in the oscillator circuit, and the radio frequency within the oscillator circuit either increases or decreases.

This energy is being amplified in the amplifier circuit and as long as there is sufficient plate current load on the vacuum tube, the relay in the plate circuit will remain closed. However, if there is insufficient plate current, the relay will open and one or more of the indicator lights will become incandescent.

A milliammeter is located in the oscillator circuit in series with the grid of the vacuum tube, and manifestly, as the current in this circuit is caused to vary by the movement of the slug tuned coil, the milliammeter will vary accordingly.

One of the slug tuned coils is located on the body of the vehicle so that any vertical movement of the vehicle body with respect to the axle will cause the slug to move in its coil, regardless of where the weight is located on the truck body. The sum total of the resonant capacity of the coils determines the sum total capacity applied to the inductance of the oscillator circuit to thereby ascertain the amount of radio frequency contained in the inductance and the reading on the milliammeter. Obviously, if the milliammeter is calibrated by initially loading the truck of the vehicle with a known weight and the slugs are properly adjusted, future unknown weights can be determined and by adjustment of the amplifier circuit an indicator can become active when the load reaches a desired amount.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views and in which.

Figure 3:
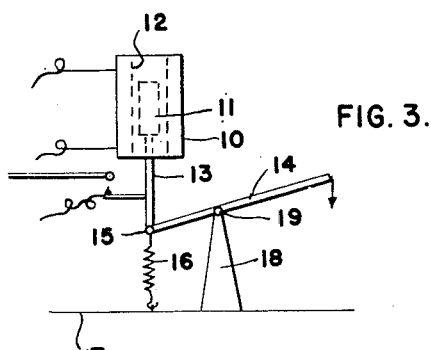
Figure 3 is a schematic view of one of the slug tuned coils.
Figure 4:
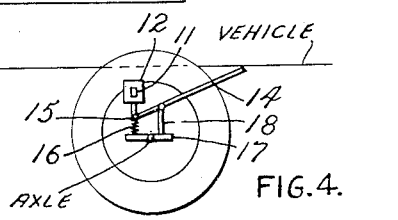
Figure 4 is a detail view of the mounting on the assembly.

As hereinabove mentioned, the gist of the invention is based on the movement of a slug or other metal object within a coil and one of the coils is placed over or located in such a position that any movement upwardly or downwardly of the vehicle body with relation to the vehicle axle will cause a movement of the slug within the coil. As shown in Figure 3, this assembly includes a coil 10, a slug or other metal object 11, movable within the coil in a space 12, the slug, of course, never contacting the coil. The slug 11 is carried by an arm 13 pivoted at one end to a lever 14, as indicated at 15 and, if desired, a tension spring 16 may extend intermediate a mounting base 17 and the arm 13. A bracket 18 is also carried by the base, and the lever 14 is pivoted thereto, as indicated at 19. By mounting this assembly, for example, on the axle of a vehicle so that the movement of the vehicle body upwardly and downwardly will be imparted to the lever arm 14, it can be seen that the slug 11 will move upwardly and downwardly with respect to the coil 10.

Figure 1:
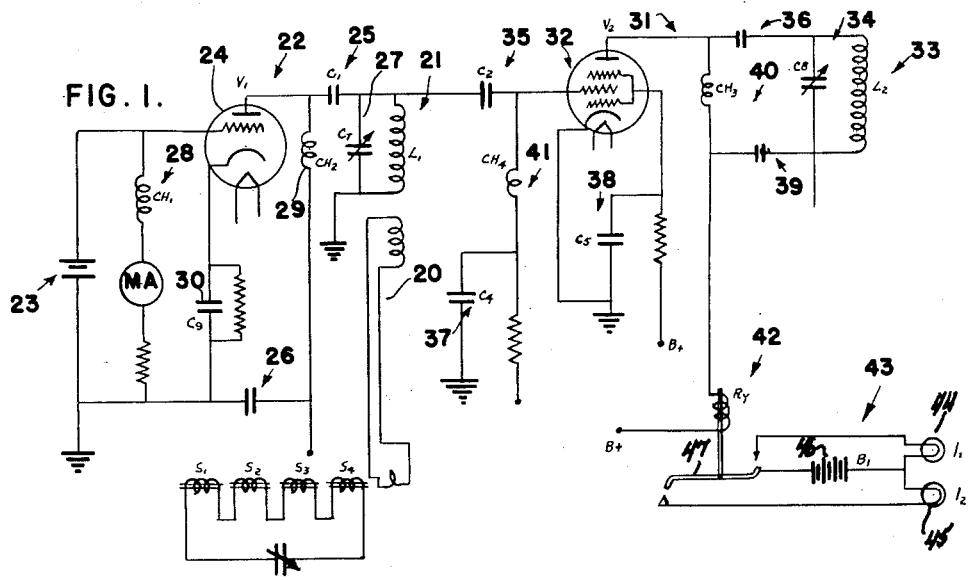
Figure 1 is a diagrammatic representation of one circuit for indicating the weight load.

Referring to Figure 1, there is illustrated a number of such coils S1, S2, S3 and S4, these coils all being coupled in series and link-tuned so that they are both independent of and dependent on each other. The circuit of the coils is link-coupled by conventional means 20 to inductance 21 of an oscillator circuit 22. The oscillator circuit includes a crystal oscillator 23 for generating radio frequency energy, and a vacuum tube oscillator 24 is provided in the circuit. The oscillator circuit also includes coupling condensers 25 and 26, variable condenser 27, chokes 28 and 29, and a by-pass condenser 30.

A conventional milliammeter MA is in series with the grid of the tube 24 and as the current is caused to vary by the movement of the slug tuned coils, the milliammeter will vary accordingly.

An amplifier circuit 31 includes a vacuum tube amplifier 32 and the plate circuit of the tube 32 is tuned to resonant frequency by inductance 33 and variable condenser 34. The amplifier circuit contains coupling condensers 35 and 36, by-pass condensers 37, 38 and 39, and chokes 40 and 41.

The plate circuit of the tube 32 controls a relay 42 and the relay actuating signal device 43. The signal device 43 may include a pair of indicator lamps 44 and 45, a source of direct current such as a battery 46, and a contactor element 47. The movement of the slug 11 within the coil 10 will, through the link coupler 20, cause a corresponding effect upon the resonant condition in the plate circuit of the oscillator tube 24 so that the radio frequency energy will either increase or decrease and vary the reading of the milliammeter. This energy is, of course, being amplified in the amplifier circuit and so long as there is sufficient plate current load on the tube 32, the relay 42 will remain closed, but when there is insufficient load, the relay will open. Manifestly, one of the indicator lights 44 or 45 will burn continuously. Assuming that the milliammeter MA is calibrated by once loading the vehicle with a known weight load and the various slugs 11 are properly adjusted, one or more weights can be determined and by adjustment of the amplifier circuit, an indicator light can be turned on when the load reaches a desired level. In such a situation, the indicator light could denote the overload of the vehicle.

Figure 2:
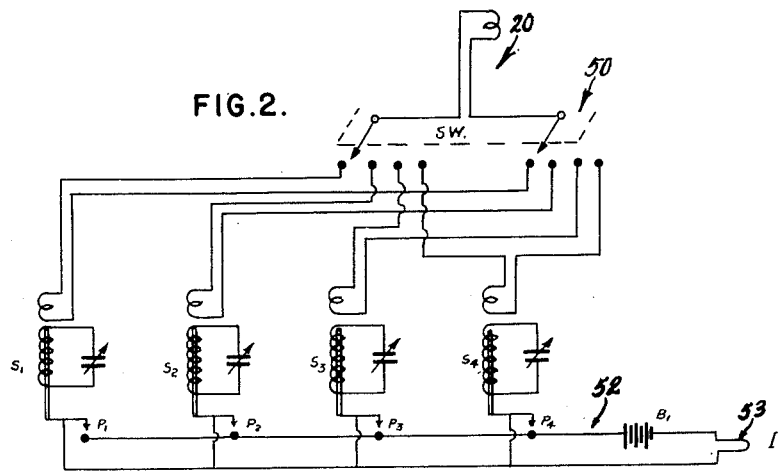
Figure 2 is a diagrammatic representation of a further circuit omitting the over-load amplifier circuit.

In Figure 2, there is shown a modification of the concept, in that the overload amplifier circuit has been omitted. In this situation, the oscillator circuit can be linked to any number of slug tuned coils, and the oscillator circuit is not shown in Figure 2 for the purpose of simplicity. It is, of course, to be understood that the circuit 22 of Figure 1 is used in connection with the arrangement of Figure 1.

It will be noted that any number of the slug tuned coils, in this instance, four, namely S1, S2, S3 and S4, are associated with the link coupler 20 through a selector switch 50, the switch being of the two-pole, four-position type. Variation of the switch connects the desired coil into the circuit and there is a contact or set of contacts on the coils, these contacts being identified P1, P2, P3 and P4 respectively. These contacts can be so adjusted that at a certain distance of movement of the slug, the contacts will close and cause an indicating unit to become effective. The drawing shows a light 53 in circuit 52 as the indicating unit although any other indicating means can be employed.

The contacts so adjusted could denote or represent overload and be used as a weight indicator by adjusting the contacts to respond properly to the distance of movement between the load and the axle and the desired calibration.

Since the characteristic of the slug tuned coil (reactive inductance) is made to vary by the movement of the slug 11 within the coil 10, the same effect could be achieved by movement of the condenser parallel across the coil winding in the Figure 2 showing. In other words, measurement of the energy could be read in the coil rather than at the source of excitation. Also, the same result could be accomplished by varying the distance of the link coupling coil from the slug tuned coil.

While I have herein disclosed and described the preferred forms of the invention, it will be apparent that changes and/or modifications therein may be found essential in meeting the exigencies of service and/or the desires of a user, and I therefore reserve the right to make any and all such changes and/or modifications as may be found desirable and/or essential, insofar as the same may fall within the spirit and scope of the invention as expressed in the accompanying claims, when broadly construed.

I claim:

1. A system of determining the weight factor of a vehicle containing a load including an oscillator circuit, a resonant circuit sensitive to the movement of the vehicle link coupled to the oscillator circuit, the resonant circuit including a fixedly mounted coil, a slug movable vertically within and spaced from the coil, an arm carried by the slug, a lever pivotally mounted on the vehicle axle intermediate the ends of the lever, means pivotally connecting one end of the lever to the arm with the other end of the lever engageable with the vehicle so that vertical movement of the vehicle relative to the axle effects vertical movement of the slug within the coil, an amplifier circuit associated with and controlled by the oscillator circuit, an indicating circuit and a relay controlling the indicating circuit actuated by the amplifier circuit to activate the indicating circuit to denote the critical weight factor.

2. A system of determining the weight factor of a vehicle containing a load including a resonant circuit sensitive to movement of the vehicle, said circuit including a plurality of fixed coils coupled in series, a slug movable vertically within and spaced from each coil, an arm carried by each slug, a lever pivotally mounted on the vehicle axle intermediate the ends of the lever, means pivotally connecting one end of the lever to the arm with the other end of the lever engageable with the vehicle so that vertical movement of the vehicle relative to the axle effects vertical movement of the slug within the coil, an oscillator circuit, means link coupling the resonant circuit to the oscillator circuit, an indicator circuit, and switch means associated with the resonant circuit and the indicator circuit to activate the indicator circuit to denote the critical weight factor.

References Cited in the file of this patent

UNITED STATES PATENTS

| | | |
|---|---|---|
| 1,987,122 | Michener | Jan. 8, 1935 |
| 2,323,023 | Flanagan | June 29, 1943 |
| 2,354,087 | Raymer | July 18, 1944 |
| 2,360,751 | Ziebolz | Oct. 17, 1944 |
| 2,488,349 | Thurston | Nov. 15, 1949 |
| 2,564,221 | Hornfeck | Aug. 14, 1951 |
| 2,592,009 | Clement | Apr. 8, 1952 |
| 2,598,812 | Marco | June 3, 1952 |
| 2,662,223 | Brewer | Dec. 8, 1953 |